US006459081B2

(12) United States Patent
Kato

(10) Patent No.: US 6,459,081 B2
(45) Date of Patent: Oct. 1, 2002

(54) ATMOSPHERIC PRESSURE IONIZATION MASS SPECTROMETER

(75) Inventor: Yoshiaki Kato, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/931,910

(22) Filed: Aug. 20, 2001

Related U.S. Application Data

(63) Continuation of application No. 09/417,167, filed on Oct. 12, 1999.

(30) Foreign Application Priority Data

Oct. 14, 1998 (JP) .......................................... 10-292028

(51) Int. Cl.[7] .......................... H01J 49/12; B01D 59/44

(52) U.S. Cl. ....................... 250/288; 250/281; 436/173; 436/174

(58) Field of Search ................................ 250/288, 310, 250/307, 281; 436/173, 174, 181

(56) References Cited

U.S. PATENT DOCUMENTS

| | | | | |
|---|---|---|---|---|
| 5,117,109 A | | 5/1992 | Asakawa et al. | 250/288 |
| 5,449,902 A | | 9/1995 | Onishi et al. | 250/288 |
| 5,480,809 A | * | 1/1996 | Salin et al. | 436/173 |

FOREIGN PATENT DOCUMENTS

| | | |
|---|---|---|
| JP | 61-95244 | 5/1986 |
| JP | 61-175560 | 8/1986 |
| JP | 5-325882 | 12/1993 |
| JP | 6-052826 | 2/1994 |
| JP | 6-186203 | 7/1994 |
| JP | 6-201650 | 7/1994 |
| JP | 6-310090 | 11/1994 |
| JP | 7-209190 | 8/1995 |

* cited by examiner

*Primary Examiner*—John R. Lee
*Assistant Examiner*—K Fernandez
(74) *Attorney, Agent, or Firm*—Kenyon & Kenyon

(57) ABSTRACT

A solution containing nonvolatile salts is pumped from a pump to an electrospray nebulization probe in the LC/MS interface, and spouted out from a tip of the probe into an atmospheric pressure environment in a form of fine liquid droplets having charges. The sample ions contained in the droplets are deflected by a deflector and enter into a mass analysis portion through an ion sampling aperture to be mass analyzed. On the other hand, the nonvolatile salts travel straight without being affected by the deflector, and collide against and are collected on a wall of a particle collector. The collected salts are precipitated in a form of crystals. The collected salts are washed away by spraying a particle washing solution from the washing nozzle. The above-described structure can provide an atmospheric pressure ionization mass spectrometer which can prevent effects of nonvolatile salts on the mass analysis without deteriorating the vacuum condition of the mass analysis portion by the preventing action.

5 Claims, 10 Drawing Sheets

ATMOSPHERIC PRESSURE IONIZATION MASS SPECTROMETER

This is a continuation of application Ser. No. 09/417,167 filed Oct. 12, 1999.

BACKGROUND OF THE INVENTION

The present invention relates to an atmospheric pressure ionization mass spectrometer in which mass spectrometry is performed by ionizing a sample in an atmospheric pressure environment.

In order to analyze a trace of an organic chemical compound with a high accuracy in various kinds of organic chemical compounds existing in an environment, a food or a body, a liquid chromatograph-mass spectrometer (an LC/MS apparatus) is growing to be widely used. The apparatus is formed by combining a liquid chromatograph (an LC) of separation means and a mass spectrometer (an MS) of a high sensitive qualitative and quantitative analysis means, and is growing to be used in various fields of the pharmacology, the medical science, the chemistry, the environmental chemistry and so on.

An important thing is the LC/MS apparatus is that the MS of a detector of the LC as the separation means is preferably capable of accepting all the analysis conditions constructed solely by the LC. However, there is a large problem in that the above premise is actually not satisfied in measuring of the LC/MS apparatus.

In an LC, in order to obtain better reproducibility by ameliorating separation and quantitativeness, a buffer solution containing various kinds of nonvolatile inorganic salts and inorganic acids is used as a mobile phase. Phosphate buffer solution is a typical one. Phosphate buffer solution is widely used in the LC because it has no absorption band in the ultraviolet range and can be used in a wide range of PH.

On the other hand, the mobile phase containing the nonvolatile salt (phosphate buffer solution or the like) can not be used in the LC/MS apparatus. This is because the LC/MS apparatus is an apparatus in which analysis is performed using a high vacuum mass spectrometer through the processes of nebulization, ionization and evaporation. That is, after being nebulized, the nonvolatile salt precipitates in an ion sampling aperture and an ion sampling capillary tube to clog them. Particularly, the ion sampling aperture and the ion sampling capillary tube are heated up to nearly 200° C. in order to prevent the evaporated water from condensing. Therefore, the nonvolatile salt is accelerated to be precipitated in the ion sampling aperture and the ion sampling capillary tube. In addition, phosphoric acid produces poly-phosphoric acid by being heated. The poly-phosphoric acid rapidly grows in crystals in the aperture and the capillary tube to clog the aperture and the capillary tube. Since a flow rate of a gas containing sample ions introduced in the MS through the aperture and the capillary tube is varies with time due to the salt precipitated with time even if the aperture and the capillary tube are not clogged yet. Therefore, stable measurement can not be expected with the LC/MS apparatus.

Since nonvolatile salts, bases and acids can not be used in the LC/MS apparatus from the above reason, analysis is performed using a buffer solution containing a volatile acid (acetic acid or the like), a volatile base (ammonia or the like) and a volatile salt (ammonium acetate or the like) instead of the nonvolatile buffer solution. Therefore, the analytical conditions constructed and established for the LC based on a phosphate buffer solution is abandoned, and accordingly an analyst is required to take the trouble of newly constructing the other analytical conditions for the LC/MS apparatus.

Some means to solve the trouble are proposed.

Japanese Patent Application Laid-Open No.61-175560 discloses a technology that a sample solution after being separated by the LC and just before being introduced into the LC/MS interface is mixed with a solution containing a chelating agent to precipitate and remove nonvolatile components so that only volatile components are transported into the MS together with the sample component. This method has a problem in that the separability is largely deteriorated because the sample component carefully separated by the column diffuses in a large volume of space for reaction and precipitation. In addition to this, the sample component is adsorbed to the precipitate to be removed together with the precipitate, and consequently practical high sensitive measurement can not be attained.

Japanese Patent Application Laid-Open No.6-52826 discloses a technology that sample component is extracted online into an organic solution by mixing the organic solution with a mobile phase, and the organic solution is let pass through an organic polymer film to separate nonvolatile salts from the solution, and then transported into the MS. An advantage of this method is that the sample component can be extracted online. On the other hand, it is inevitable that the separation performance and the sensitivity are decreased by increase in the dead volume after separation in the column. Further, it is impossible to measure a high polar compound which is difficult to be transferred to an organic solution.

Japanese Patent Application Laid-Open No.6-201650 and Japanese Patent Application Laid-Open No.6-186203 disclose another method in which nonvolatile salts are removed and sample components are selectively introduced into the LC/MS interface. In this method, an eluted sample component is once trapped to a trap column, and then the trap column is washed with water by switching a valve of the LC/MS apparatus to remove nonvolatile salts. After that, by switching the valve again, the sample component is eluted from the trap column using an organic solution to be transferred into the MS. According to this method, nonvolatile salts can be removed with a very high efficiency. Further, the method has an advantage in capability of high sensitive measurement and so on since the sample component is once trapped and then eluted. On the other hand, the method has a large disadvantage in that the apparatus becomes complex and expensive, and online removing of all salts over the whole chromatograph (over the whole range of the samples) though specified components can be removed.

Japanese Patent Application Laid-Open No.5-325882 proposes a technique different from the above-mentioned technique in order to solve this problem.

A component from an LC is nebulized and ionized in an LC/MS interface. The nebulized flow including ions travels straight. At a position midway of the trajectory, the ions are deflected from the nebulized flow by a deflector applied with a voltage. The ions are collected into a differential pumping system through an ion sampling aperture, and guided to a high vacuum mass analysis portion to be mass-analyzed. Nonvolatile salts in the nebulized flow travel straight without being affected by the electric field of the deflector in the forms of fine liquid droplets, fine particles or clusters formed of fine liquid droplets and fine particles, and collided against a collecting plate to be trapped. This technique is a good method capable of online removing the nonvolatile components. However, when a phosphate buffer solution of 10 mM is actually let flow at a flow rate of 1 ml/min, approximately 1 g of the phosphates is accumulated on the collecting plate by measurement in one day (8 hours). The precipitated phosphates are formed in flossy crystals of which the apparent specific gravity is extremely small. Therefore, the collecting plate is fully filled with the phosphate crystals in a short time. Further, since the crystals are extremely brittle and soft. Therefore, the crystals are sometimes crushed by the high speed nebulizing gas flow and sucked into the ion sampling aperture to clog the aperture. Japanese Patent Application Laid-Open No.5-325882 discloses an idea that the trapped substances are removed by heating the collecting plate, but phosphoric acid and inorganic acids and bases can not be removed by heating. This method is effective in using a mobile phase containing nonvolatile salts for a short time, but ineffective in stably measuring for a longtime.

Japanese Patent Application Laid-Open No.61-95244 discloses an LC/MS apparatus in which a buffer solution containing nonvolatile salts is used as an eluent for the liquid chromatograph. When nonvolatile salts are contained in an eluent, the salts are precipitated and attached to the heated nebulization capillary tube to cause clogging of the heated capillary tube. This is likely to occur at the time of ending of measurement, that is, particularly at the time when the solution is stopped to flow. In order to solve this problem, in the LC/MS apparatus disclosed in Japanese Patent Application Laid-Open No.61-95244, a solution capable of dissolving the salts is let flow through the heated capillary tube at the time of ending of measurement replacing the eluent to wash the inside of the heated capillary tube and wash away the precipitated salts with the solution. The nonvolatile salts also clog a sampling aperture electrode in the mass analysis portion. Therefore, Japanese Patent Application Laid-Open No.61-95244 also proposes that the solution capable of dissolving the salts is nebulized and let flow toward the sampling aperture to wash away the precipitated salts at the time of not performing measurement. However, since the technology disclosed in Japanese Patent Application Laid-Open No.61-95244 can not wash away the nonvolatile salts during measurement, the method has a problem in that stable measurement can not be continued for a long time. In addition to this, when the washing solution is sprayed toward the sampling aperture, the washing solution enters into the mass analysis portion to make it difficult to maintain a vacuum condition of the inside.

SUMMARY OF THE INVENTION

An object of the present invention is to provide an atmospheric pressure ionization mass spectrometer which can prevent effects of nonvolatile salts on the mass analysis without deteriorating the vacuum condition of the mass analysis portion by the preventing action.

Another object of the present invention is to provide an atmospheric pressure ionization mass spectrometer which can perform stable measurement practically without effects of nonvolatile salts on the mass analysis.

From one aspect, the present invention is characterized by an atmospheric pressure ionization mass spectrometer comprising an ion generating means for generating ions by nebulizing a sample solution in an atmospheric pressure environment; a particle collector disposed on a main axis of a nebulized flow of the sample solution; a mass spectrometer for mass analyzing ions passing along an axis departing from the main axis, the ions being generated by the ion generating means; and a washing means for washing the particle collector.

From another aspect, the present invention is characterized by an atmospheric pressure ionization mass spectrometer comprising an ion generating means for generating ions by nebulizing a sample solution in an atmospheric pressure environment; an evacuation duct disposed on a main axis of a nebulized flow of the sample solution; and a means for evacuating the nebulized flow passing along the main axis through the evacuation duct.

DETAILED DESCRIPTION

Figure 10:
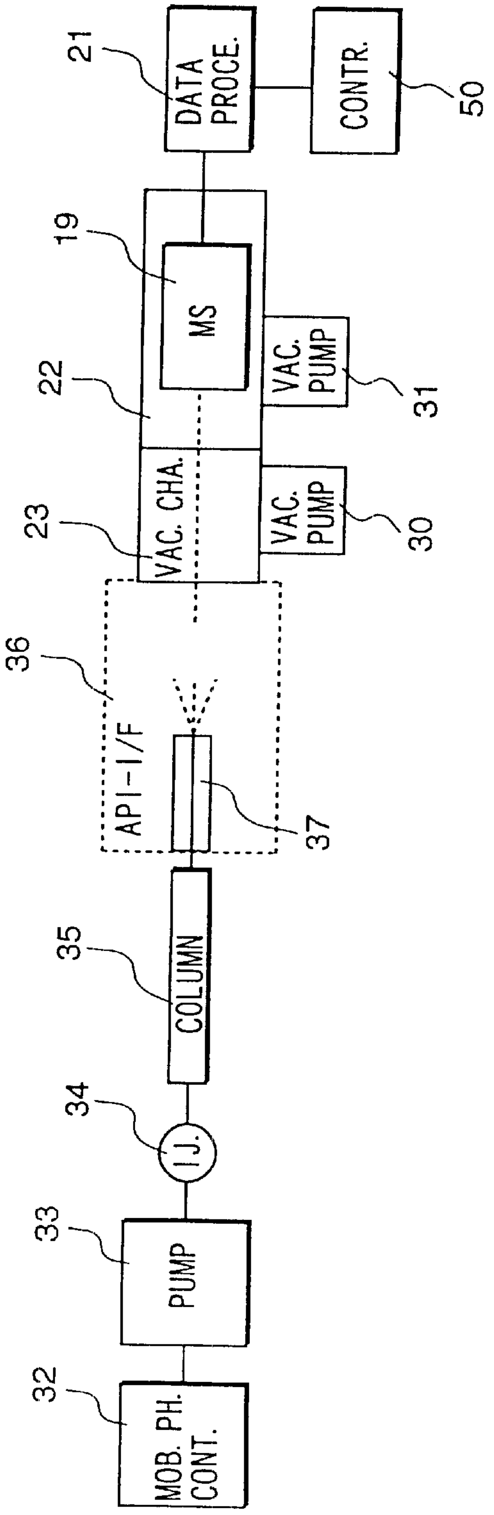
FIG. 10 is a block diagram showing an embodiment of an atmospheric pressure ionization mass spectrometer which may employ the atmospheric pressure ionization LC/MS apparatus in accordance with the present invention.

FIG. 10 shows an embodiment of an atmospheric pressure ionization mass spectrometer which may employ the atmospheric pressure ionization LC/MS apparatus in accordance with the present invention. A liquid sample is injected from a sample injector 34 of an LC (liquid chromatograph) and introduced into an analytical column 35 together with a mobile phase solution (eluent) pumped from a mobile phase container 32 using a pump 33. The sample is separated into the individual components by the analytical column 35. Water, an organic solution such as methanol, acetonitrile or the like, or a mixture of them is used for the mobile phase. The separated sample component is comes out from the analytical column 35 together with the mobile phase and is introduced into an atmospheric pressure ionization interface 36 of the LC/MS apparatus through a capillary.

A high voltage of 3 kV to 6 kV is applied to a tip of a nebulizer 37 in the atmospheric pressure ionization interface 36. The sample solution is spouted out there into an atmospheric pressure environment in a form of fine liquid droplets having charge by high speed nitrogen gas spouting in the same direction as an axial direction of the capillary and by the high voltage. The fine droplets collide with gas molecules in the atmospheric pressure environment to be further fined, and the ions are finally released into the atmospheric pressure environment. This is the electrospray ionization method.

A vacuum chamber 23 and a mass analysis portion 22 are differentially evacuated by vacuum pumps 30, 31 so as to maintain them in preset degrees of vacuum. The ions are introduced into the vacuum chamber 23 and further introduced to a mass spectrometer 19 in the mass analysis portion 22 through an aperture and a capillary tube disposed in the vacuum chamber to be mass analyzed. A mass spectrum and a mass chromatogram are formed by a data processor 21. A controller 50 is connected to the data processor 21, and controls sample injection from the mass analysis portion 22, the atmospheric pressure ionization interface 36 and the sample injector 34, and the pump 33.

Figure 1:
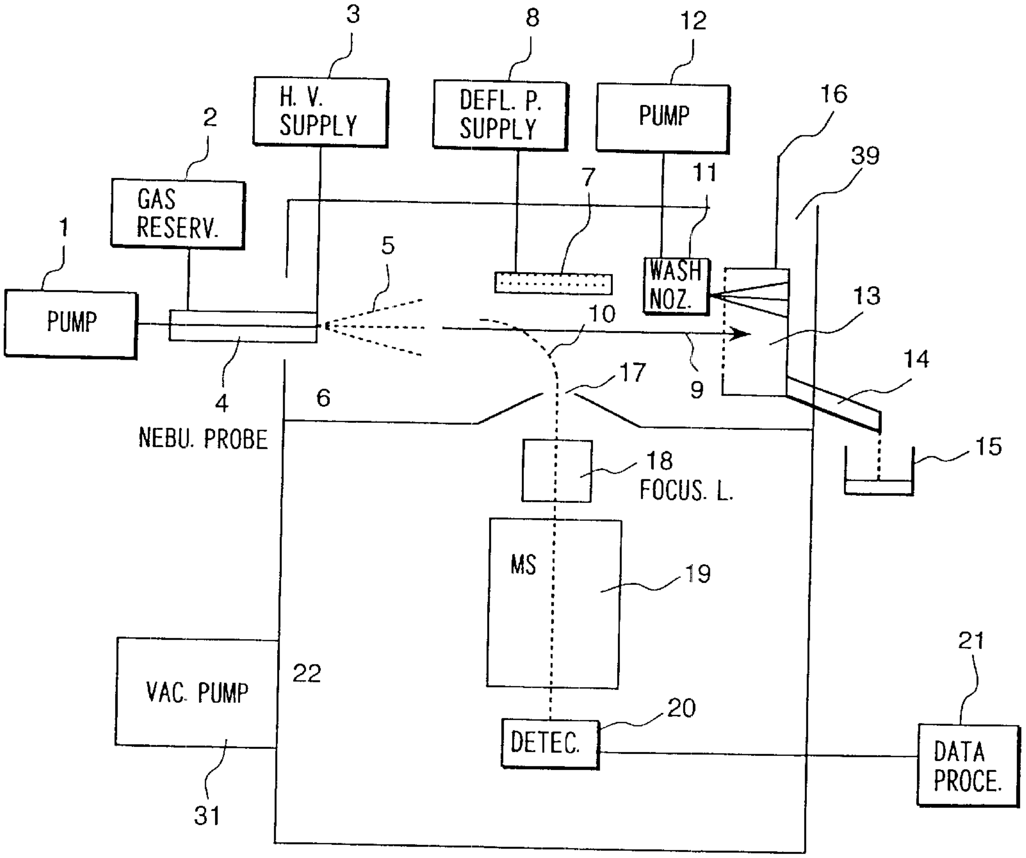
FIG. 1 is a block diagram showing the configuration of an embodiment of an atmospheric pressure ionization mass spectrometer in accordance with the present invention which can be employed by an atmospheric pressure ionization LC/MS apparatus shown in FIG. 10.

FIG. 1 shows an embodiment of an atmospheric pressure ionization mass spectrometer in accordance with the present invention which can be employed by an atmospheric pressure ionization LC/MS apparatus shown in FIG. 10. A solution containing a nonvolatile salt is pumped from a pump 1 to an electrospray nebulization probe 4 in the LC/MS interface. A direct current voltage of approximately 3 to 6 kV supplied from a high voltage power supply 3 is applied to a tip of the nebulization probe 4. The solution is spouted out from the tip of the probe 4 into an ionization space 6 in a form of fine liquid droplets 5 having charge by a high electric field formed near the tip of the probe 4 by the high voltage and by nitrogen gas transferred from a nebulizing nitrogen gas reservoir 2.

Since the charged fine droplets collide with gas molecules while traveling in the ionization space 6 to evaporate the liquid from the droplet surfaces, the droplets are fined. Therefore, the sample ions contained in the droplets are finally released into the ionization space 6. A deflector 7 applied with a voltage having the same polarity as that of the ions from a power supply 8 is arranged at a position midway of a path of the gas flow 9. The ions are deflected by the deflector 7 and travel along a trajectory 10 departing from the gas flow path to enter into a mass analysis portion 22 evacuated by a vacuum pump 31 through an ion sampling aperture 17. The ions are focused there by a focusing lens 18 and launched into a mass spectrometer 19 maintained at a preset vacuum. There, the ions are mass-dispersed and detected by a detector 20 to be processed into a mass spectrum or a mass chromatogram by a data processor 21.

Figure 4:
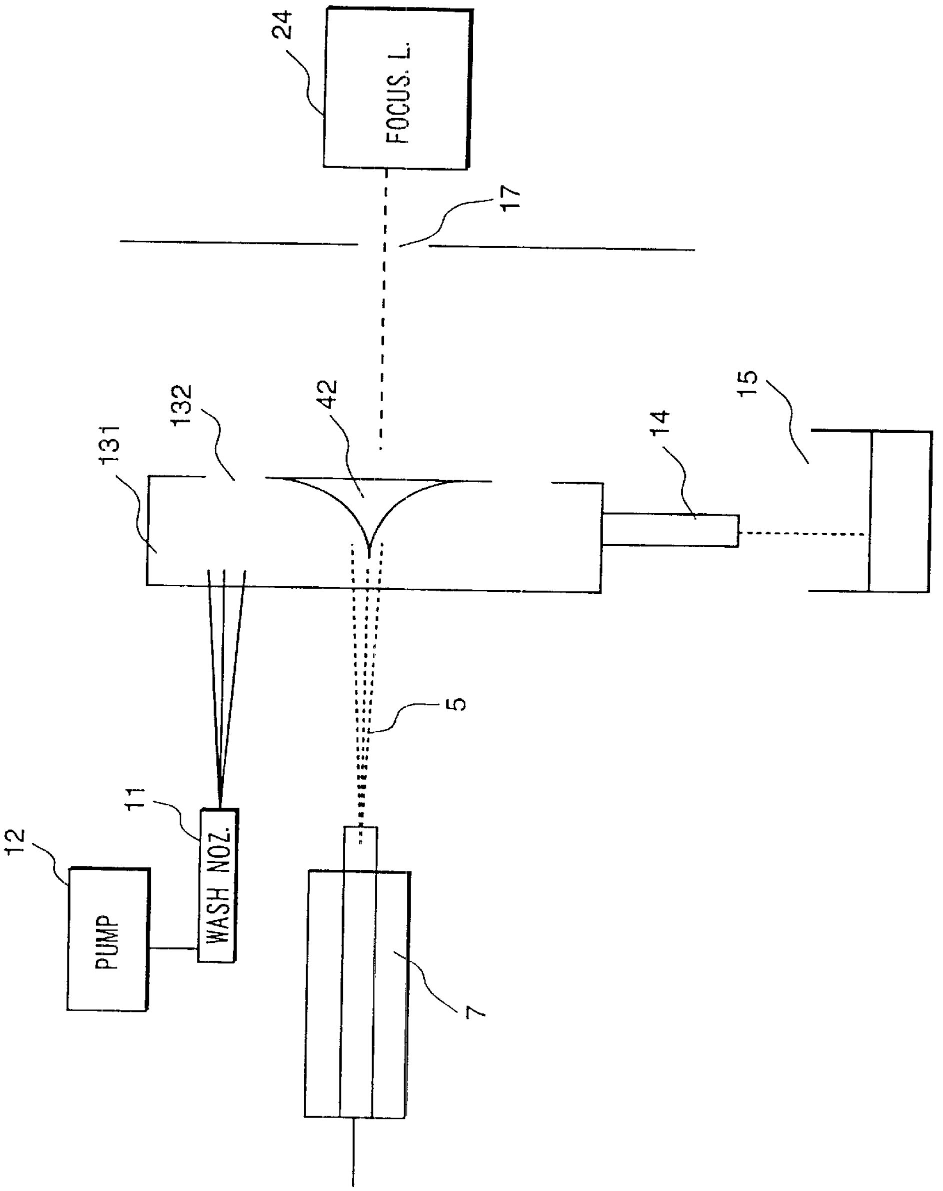
FIG. 4 is a view explaining precipitation of nonvolatile salts in the embodiment of FIG. 2.

On the other hand, the phosphates can not be evaporated, and are condensed in the droplets and finally become fine particles not having charge. The fine particles travel straight along the path of the gas flow 9 without being affected by the deflector 7. A particle collector 13 is arranged on the main axis of the nebulized flow of the sample solution traveling straight. The particle collector 13 is box-shaped, and the box-shaped particle collector has an opening at a position downstream of the nebulized flow of the sample solution and on the main axis of the nebulized flow and the vicinity. Therefore, since the particles in the nebulized flow traveling along the main axis enter into the particle collector 13 and collide against a wall of a particle collision member, the fine particles of the nonvolatile salts are collected on the wall of the particle collector 13. The remaining gas is evacuated from an ionization space 6 to the external through an exit 39. The collected salts are precipitated on the wall of the particle collector 13 as crystals. According to an experiment, as shown in FIG. 4, the crystals are growing in a cone-shape, as shown by the reference character 42, toward the upstream direction of the gas flow 9. The crystals are flossy and very soft and brittle. When the growth of the crystals is progressed, the crystals may be easily collapsed by disturbance of flow or vibration. Therefore, it is preferable that the particle collector 13 is the box-shape so as to receive the collapsed crystals. A washing nozzle 11 is arranged in an upper portion of the particle collector 13. A washing solution is supplied to the washing nozzle 11 from a pump 12. The washing solution may be water, or water containing a volatile acid such as acetic acid or the like, a volatile base such as ammonia or the like, or a salt such as ammonium acetate or the like. Since phosphate or the like precipitated on the particle collector 13 is very easily dissolved in water, the salt can be dissolved and washed away by spraying water to the crystals. The collected salt can be washed away by spraying a particle washing solution from the washing nozzle 11 against the particle collector, particularly, against the wall of the particle collision member irrespective of before measurement, during measurement and after measurement. The washed solution is discharged to the external through a drain 14 provided at a bottom portion of the particle collector 13 and stored in a beaker 15 or the like.

The particle collector 13 can be completely washed and cleaned by attaching a knob 16 onto the particle collector so as to be easily took off from the position shown in the figure to the external.

By doing so, the ions are separated from the nonvolatile salts and introduced into the mass spectrometer 19 through the ion sampling aperture 17. The ion sampling aperture may be replaced by a capillary tube, and is heated up to approximately 200° C. so as to prevent the solution from condensing. According to the embodiment, since the nonvolatile salts are removed before entering into the ion sampling aperture 17, the ion sampling aperture can not be clogged and accordingly effect of the nonvolatile salts on the mass analysis can be prevented. Further, since the nonvolatile salts collected onto the particle collector 13 are washed away by the washing solution such as water and the high vacuum of the mass analysis portion is not degraded during washing, the user can continue stable measurement for a long period without any special maintenance.

Figure 2:
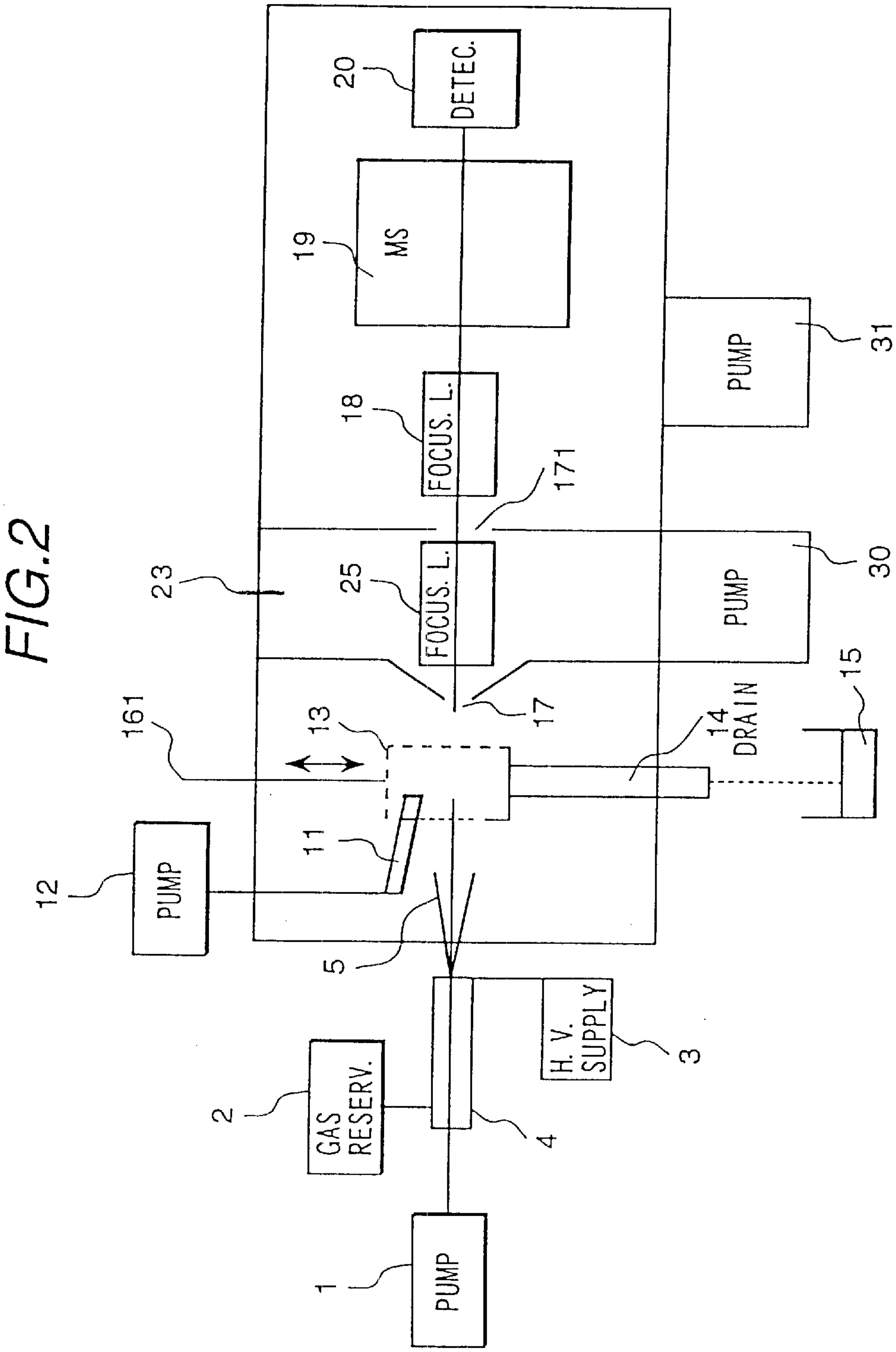
FIG. 2 is a block diagram showing the configuration of another embodiment of an atmospheric pressure ionization mass spectrometer in accordance with the present invention which can be employed by the atmospheric pressure ionization LC/MS apparatus shown in FIG. 10.

FIG. 2 shows another embodiment of an atmospheric pressure ionization mass spectrometer in accordance with the present invention which can be employed by the atmospheric pressure ionization LC/MS apparatus shown in FIG. 10. In this embodiment, the particle collector 13 for collecting the nonvolatile salts is arranged at a position between the electrospray nebulization probe 4 and the ion sampling aperture 17. The solution containing the nonvolatile salts is pumped by the pump 1 and nebulized into the ionization space 6 through the tip of the nebulization probe 4 by the high voltage supplied from the high voltage supply 3 and by the nebulizing gas 2. The nebulized droplets 5 travel straight in the ionized space 6, and enter into the collecting box 13.

Figure 3:
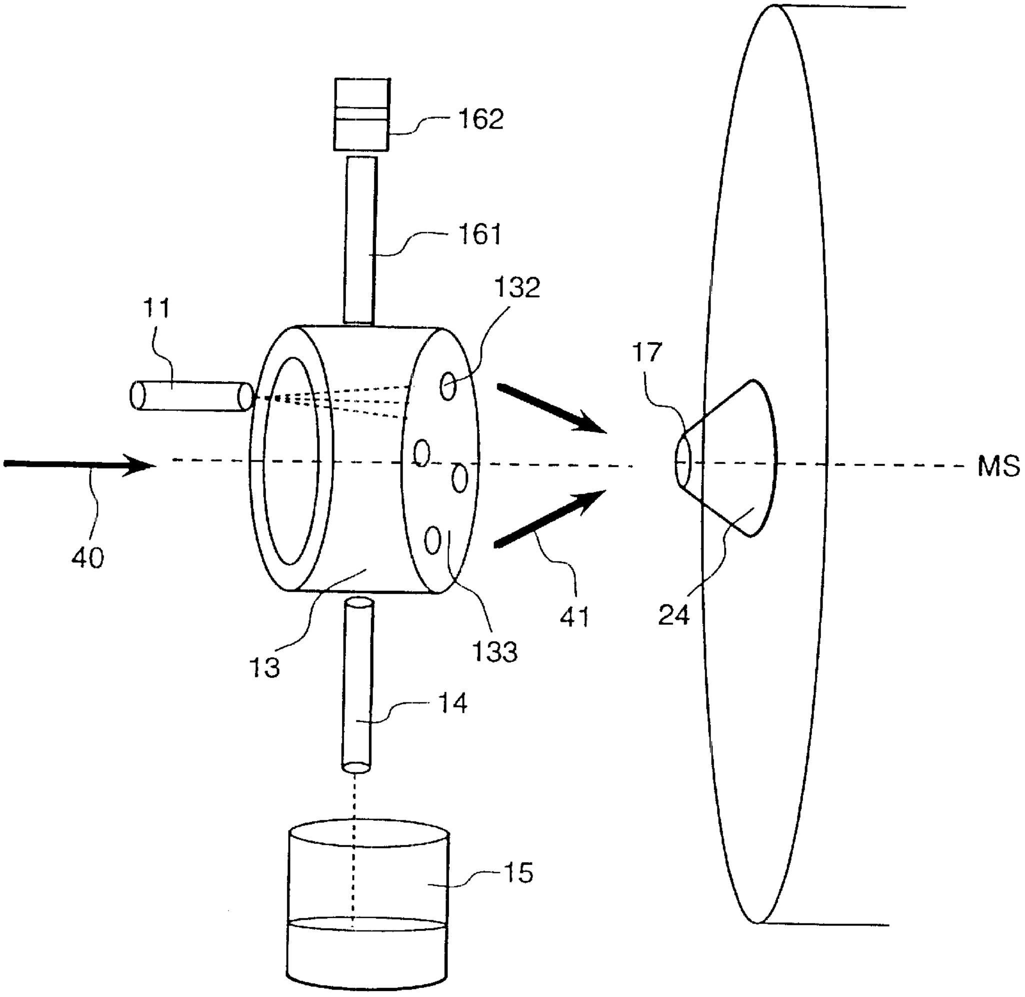
FIG. 3 is an enlarged view showing the vicinity of a particle collector of FIG. 2.

FIG. 3 is an enlarged view showing the vicinity of the particle collector of FIG. 2. The generated nebulized flow collides against the wall 133 of the particle collector 13 shown in FIG. 3, and the nonvolatile salts are precipitated on the surface of the wall. The particle collector 13 is formed in a cylindrical box (a square shaped box is also acceptable), and a portion of the cylinder in the upstream side of the nebulized flow is opened to form an inlet for the nebulizing gas. A plurality of small circular through holes 132 are opened on the wall 133 in the opposite side of the opening arranged concentrically with respect to the center axis of the cylinder. Knobs 161, 162 used for taking the collecting box off to the external are attached at the upper side surface of the cylinder. Further, a drain 14 for discharging the particle collector wash solution to the external is arranged at the lower side surface of the cylinder. The wash solution from the drain 14 is contained in a beaker 15.

The nebulized flow containing ions enters into the particle collector 13 and the nonvolatile salts travel straight by inertia and collide against the wall 133 of the particle collector 13 to be trapped because the nonvolatile salt particles are large in size. The spouted flow 40 containing the ions passes through the through holes 132, and flows back around in the rear of the particle collector 13 as shown by the reference character 41. The ions enter into the differential evacuation system portion 23 of the mass spectrometer through the ion sampling aperture 17 to be focused by a focusing lens 25. The ions enter into the mass analysis portion 22 through a next aperture 171, and are focused by the focusing lens 18 and mass separated by the mass spectrometer 19, and then detected by the detector 20. As shown in FIGS. 2, 3 and 4, the particle collector 13 is disposed at the position between the nebulization probe 4 and the sampling aperture 17. The nonvolatile salts spouted from the nebulization probe 4 and trapped on the wall surface of the collecting box are accumulated and precipitated in a cone shape at a position near the center of the wall 133 having the through holes 132 as shown by the reference character 42 in FIG. 4. The precipitated salts are washed away by the washing solution pumped by the pump 12 and spouted from the spray nozzle 11, and discharged to the beaker 15 in the external through the drain 14.

Figure 5:
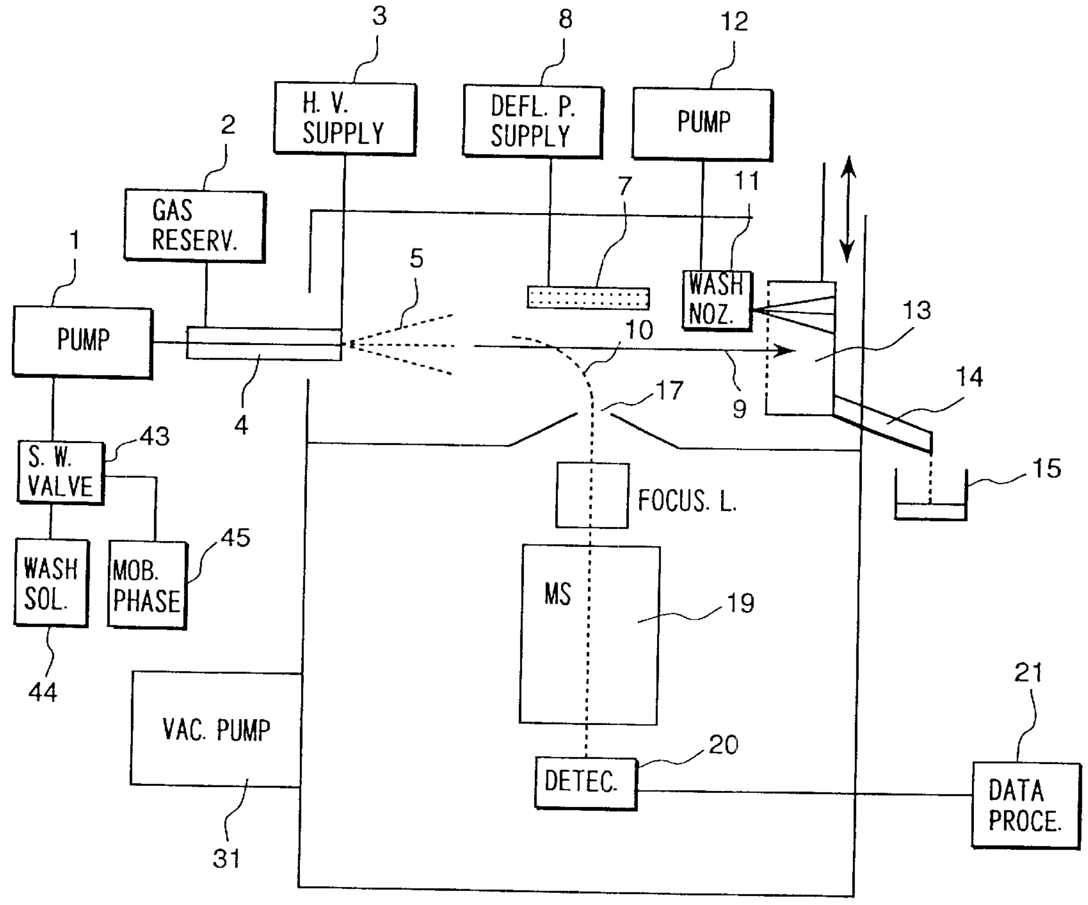
FIG. 5 is a block diagram showing the configuration of a still further embodiment of an atmospheric pressure ionization mass spectrometer in accordance with the present invention which can be employed by the atmospheric pressure ionization LC/MS apparatus shown in FIG. 10.

FIG. 5 shows a still further embodiment of an atmospheric pressure ionization mass spectrometer in accordance with the present invention which can be employed by the atmospheric pressure ionization LC/MS apparatus shown in FIG. 10.

In the embodiments 1 and 2, washing of the nonvolatile inorganic salts 42 precipitated on the particle collector 13 is performed by water sprayed from the washing nozzle 11 arranged at the position near the collecting box 13. In a case of analysis in an LC/MS apparatus, it is recommended that at the beginning of measurement or at the ending of measurement, the analytical column and the ultraviolet (UV) detector of the LC, not shown, should be cleaned by washing away the salts with water, and the water substitutes for an organic solution or the like for the last time. This is preventive procedures for preventing occurrence of damage precipitating in the column or in the cell of the UV detector, not shown, and for starting the next measurement soon.

By making use of washing the whole system with water at the beginning or at the ending of measurement, as described above, washing of the particle collector 13 for the nonvolatile salts can be performed. The washing solution is pumped from a container 44 storing the washing solution to the nebulization probe 4 using the pump 1 through a switch valve 43. There, the washing solution is nebulized into the ionization space 6 by the nebulizing gas 2. In this case, the high voltage applied to the tip of the nebulization probe 4 during normal analysis is switched off. Under this condition, the droplets of the nebulized washing solution travel straight, and collide against and condense on the wall of the particle collector 13 to wash away the salts. The high voltage for the electrospray may be applied to the tip of the nebulization probe 4 during washing. However, when the high voltage is not applied, the size (diameter) of the nebulized droplets becomes large and accordingly it is possible to increase an amount of water which reaches the particle collector 13 and is used for washing. Further, by reducing pressure of the nebulizing gas 2, the diameter of the nebulized droplets can be also increased, and accordingly the precipitated salts can be effectively washed away.

In a case of normal analysis, measurement is performed by switching the switch valve 43 to the container 45 of the mobile phase containing an inorganic acid. Although it has been described in the above that the disposing position of the particle collector 13 is the same as in FIG. 1, the type of FIG. 2 may be employed regardless of the switching type of the mobile phase. Furthermore, the nebulization probe 4 may be moved toward the particle collector 13 in order to efficiently send the washing droplets to the particle collector 13 during washing. In this case, the particle collector 13 may be moved manually or automatically using a motor.

Figure 6:
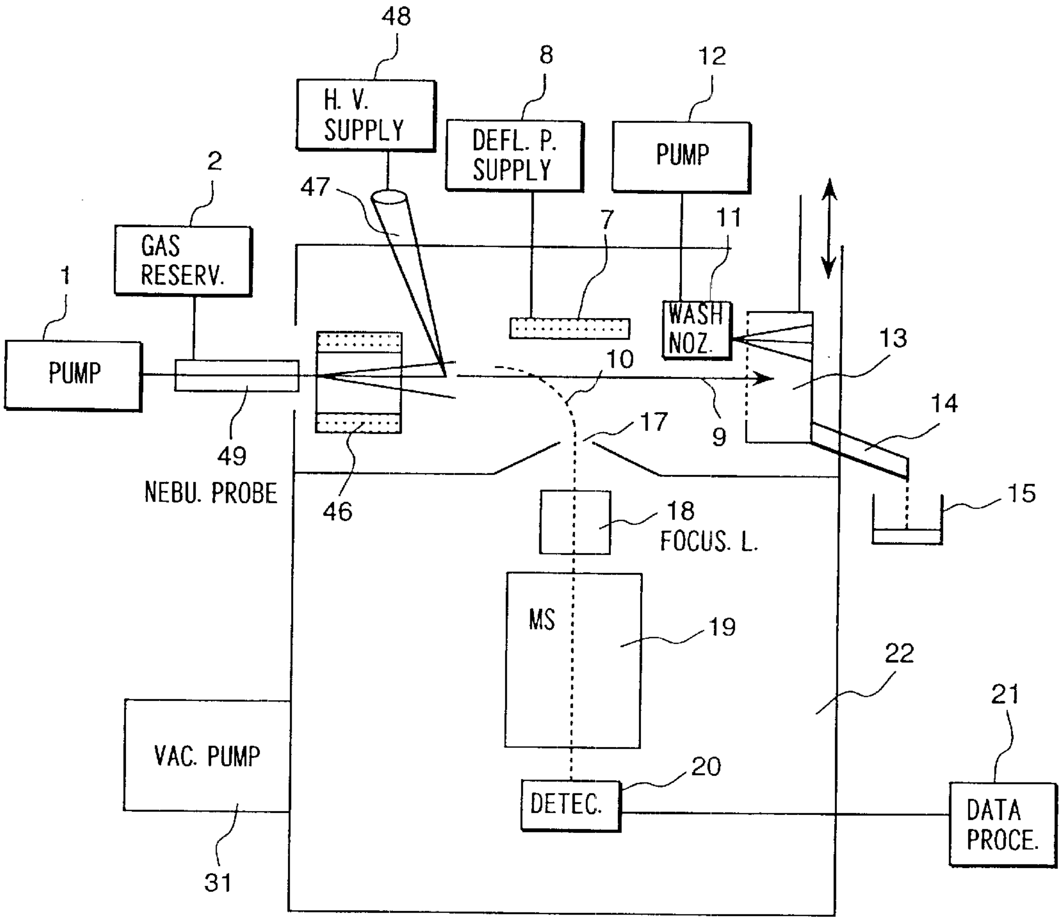
FIG. 6 is a block diagram showing the configuration of another embodiment of an atmospheric pressure ionization mass spectrometer in accordance with the present invention which can be employed by the atmospheric pressure ionization LC/MS apparatus shown in FIG. 10.

FIG. 6 shows the configuration of another embodiment of an atmospheric pressure ionization mass spectrometer in accordance with the present invention which can be employed by the atmospheric pressure ionization LC/MS apparatus shown in FIG. 10. In this embodiment, the ionization type is an atmospheric pressure chemical ionization (APCI) type. The solution containing the inorganic salts pumped by the pump 1 is nebulized from a tip of a nebulization probe 49 into the ionization space 6 with being assisted by the nebulizing gas 2. The nebulized droplets are accelerated to be evaporated by heating (approximately 300 to 500) of a heater 46 disposed so as to cylindrically surround the nebulized flow.. The nebulized flow travels further in the downstream direction to be ionized by corona discharge generated a tip of a corona discharge needle electrode 47 applied with a voltage of 3 kV to 6 kV supplied from a high voltage supply 48. The ions are deflected by the deflector 7 and enter into the mass analysis portion through the ion sampling aperture 17 to be mass analyzed by the mass spectrometer 19. The inorganic salts are not vaporized by the heating of the heater 46, but carried in the downstream direction while being condensed in crystals to be trapped on the wall surface of the particle collector 13. The trapped salts are washed away by the washing solution spouted from the spray nozzle 11 and discharged to the external through the drain 14.

Therein, it has been shown that the particle collector 13 is arranged at the position downstream of the nebulized flow, and the ions are deflected by the deflector. However, the particle collector 13 may be arranged at a position between the corona discharge needle electrode 47 and the ion sampling aperture 17, as similar to the case shown in FIG. 2. Further, washing may be performed by nebulizing the washing solution through the nebulization probe 49, not using a dedicated nozzle. In this case, it is preferable that the temperature of the heater 46 is set to at a temperature below 200° C. in order to prevent precipitating of the nonvolatile salts. Further, it is preferable that the high voltage applied to the corona discharge needle electrode is switched off.

It is preferable that the inorganic salts precipitated on the particle collector 13 are washed away before the crystals of the inorganic salts grow large. In order to do so, it is preferable that a preset number of measurement times is input to the controller 50 so that washing is automatically performed every the preset number of measurement times.

Figure 7:
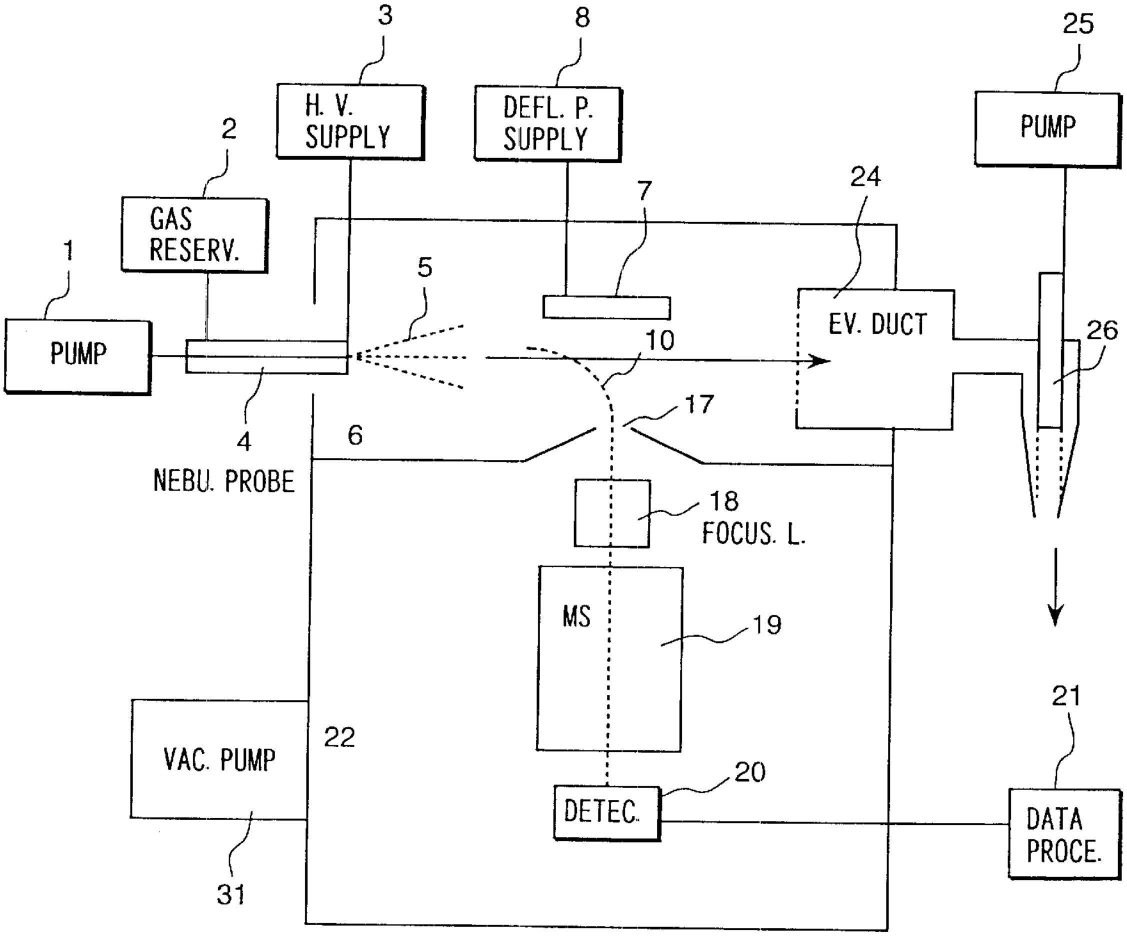
FIG. 7 is a block diagram showing the configuration of a further embodiment of an atmospheric pressure ionization mass spectrometer in accordance with the present invention which can be employed by the atmospheric pressure ionization LC/MS apparatus shown in FIG. 10.

FIG. 7 shows a further embodiment of an atmospheric pressure ionization mass spectrometer in accordance with the present invention which can be employed by the atmospheric pressure ionization LC/MS apparatus shown in FIG. 10.

In all the embodiments described above, the particles of the nonvolatile salts collide with the wall to precipitate crystals, and then the crystals are washed away with the washing solution and discharged outside the system. In most cases, the produced crystals are generally flossy and very brittle. The crystals is likely to be mechanically crushed by the nebulized flow to contaminate the surrounding. A method of discharging the nonvolatile salts without precipitating crystals will be described here. The fine particles of the nonvolatile salts generated in the nebulized flow travel straight along the main axis. A cylindrical evacuation duct 24 is arranged in the downstream side of the nebulized flow. A liquid-jet (water-jet) pump (aspirator) 26 is connected to the evacuation duct. Water as the washing solution is pumped to the water-jet pump from a pump 25 to evacuate the evacuation duct 24. The nonvolatile salts travel together with the nebulized flow and are evacuated by the water-jet pump. The nonvolatile salts are easily dissolved into the water of the water-jet pump and discharged to the atmosphere.

Therein, a diaphragm pump or a fan may be used for evacuation instead of the water-jet pump. In this case, since phosphates may be possibly attached onto the diaphragm or the fan, it is preferable to remove the salts by letting the evacuated gas pass through a trap using water capable of washing away the salts or pass through water by bubbling before entering into the diaphragm pump or the fan.

Further, a small-sized oil rotary pump may be used, but it is preferable to dispose a tap for removing the nonvolatile salts in the front stage.

The nonvolatile salts are likely to precipitate at stagnant positions. Therefore, it is preferable that the particle collector and the evacuation duct are formed in a simple structure so as to suppress occurrence of flow stagnation and turbulent flow.

Figure 8:
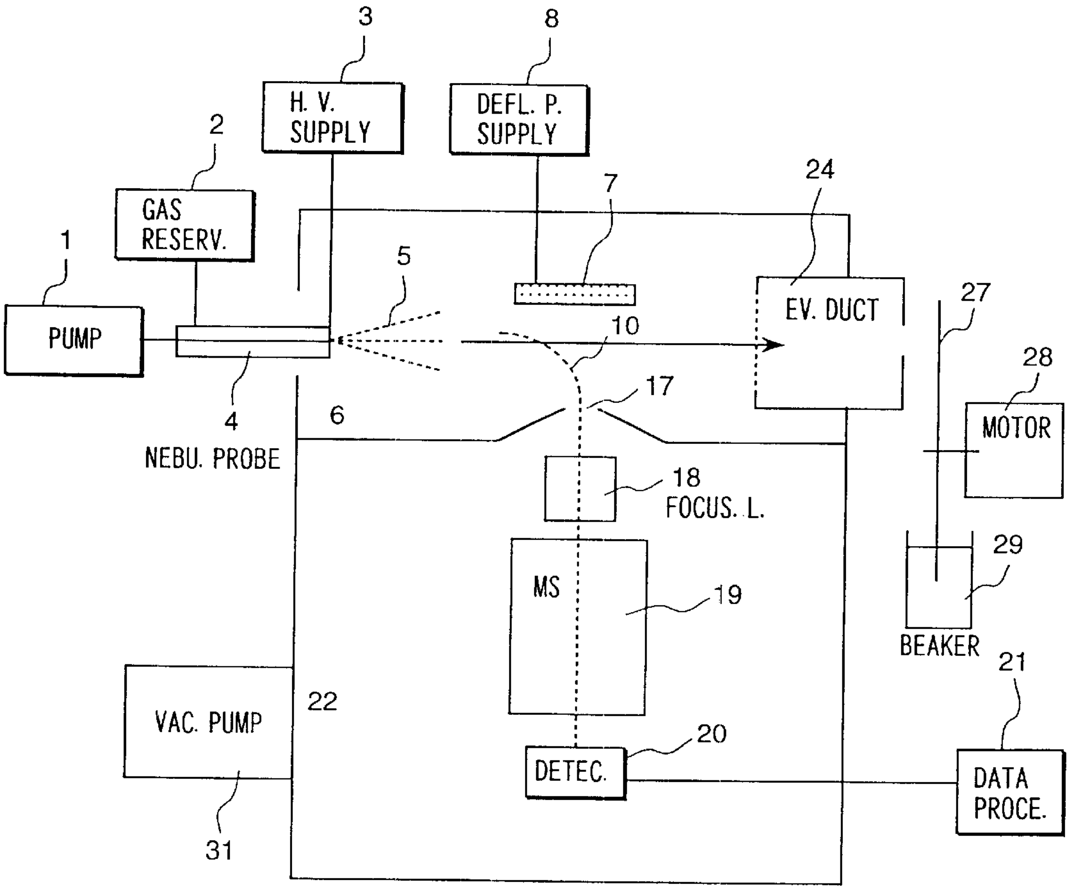
FIG. 8 is a block diagram showing the configuration of a still further embodiment of an atmospheric pressure ionization mass spectrometer in accordance with the present invention which can be employed by the atmospheric pressure ionization LC/MS apparatus shown in FIG. 10.

FIG. 8 shows a still further embodiment of an atmospheric pressure ionization mass spectrometer in accordance with the present invention which can be employed by the atmospheric pressure ionization LC/MS apparatus shown in FIG. 10.

The fine particles of the nonvolatile salts travel straight together with the gas flow, and collide against a surface of a rotating disk 27 arranged downstream of the evacuation duct 24 and are precipitated in crystals on the surface. The rotating disk 27 is slowly rotated by a motor 28. Since a new surface always appears at the collision position as the collision surface, an amount of crystals precipitated on the rotating disk is limited to a small value. A beaker 29 filled with a washing solution is placed in a lower portion of the rotating disk 27, and the disk is dipped in the washing solution. The nonvolatile salts are precipitated in the upper portion of the rotating disk 27 and at the same time the salts are removed by washing in the lower portion. Therefore, the surface colliding with the nonvolatile salts becomes the washed new surface.

Figure 9:
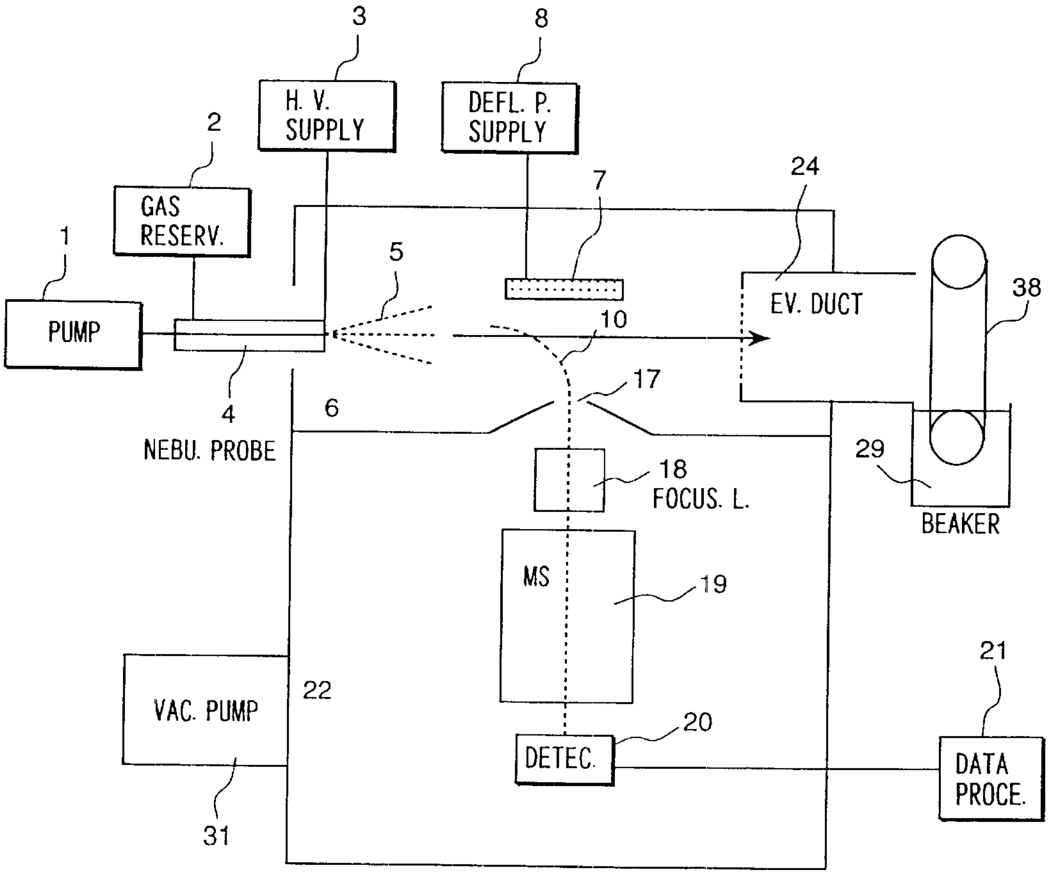
FIG. 9 is a block diagram showing the configuration of a further embodiment of an atmospheric pressure ionization mass spectrometer in accordance with the present invention which can be employed by the atmospheric pressure ionization LC/MS apparatus shown in FIG. 10.

FIG. 9 shows a further embodiment of an atmospheric pressure ionization mass spectrometer in accordance with the present invention which can be employed by the atmospheric pressure ionization LC/MS apparatus shown in FIG. 10. This embodiment might be a modification of the embodiment of FIG. 8. The nonvolatile salt collision surface is not a disk but an endless belt (moving belt) 38. Similar to the case of FIG. 8, the nonvolatile salts are precipitated on the wall in the upper portion and at the same time the salts are removed by washing in the lower portion.

According to the present invention, it is possible to provide an atmospheric pressure ionization mass spectrometer which can prevent effects of nonvolatile salts on the mass analysis without deteriorating the vacuum condition of the mass analysis portion by the preventing action.

According to the present invention, it is also possible to provide an atmospheric pressure ionization mass spectrometer which can perform stable measurement practically without effects of nonvolatile salts on the mass analysis.

What is claimed is:

1. An atmospheric pressure ionization mass spectrometer comprising:

an ion generating means for generating ions by nebulizing a sample solution from a liquid chromatograph;

an evacuation duct disposed on a main axis of a nebulized flow of said sample solution;

an aspirator for aspirating and discharging said nebulized flow through said evacuation duct outside said aspirator;

a deflector, disposed between said ion generating means and said evacuating duct, for deflecting the generated ions by said ion generating means; and a mass analyzer for mass analyzing the deflected ions by said deflector.

2. An atmospheric pressure ionization mass spectrometer comprising:

an ion generating means for generating ions by nebulizing a sample solution in an atmospheric pressure environment;

an evacuation duct disposed on a main axis of a nebulized flow of said sample solution, for discharging said neublized flow;

a deflector, disposed between said ion generating means and said evacuating duct, for deflecting the generated ions by said ion generating means; and a mass analyzer for mass analyzing the deflected ions by said deflector, wherein said evacuation duct comprises a collision member having a surface against which at least said nebulized flow of said sample solution is collided; a means for driving said collision member; and a washing means for washing said collision member placed at a position different from a position where said nebulized flow is collided with said collision member.

3. An atmospheric pressure ionization mass spectrometer according to claim 2, wherein said collision member is disk-shaped.

4. An atmospheric pressure ionization mass spectrometer according to claim 2, wherein said collision member is a moving belt.

5. An atmospheric pressure ionization mass spectrometer according to claim 2, wherein said washing solution is water.

* * * * *